United States Patent [19]
Dahlgren

[11] Patent Number: 5,269,275
[45] Date of Patent: Dec. 14, 1993

[54] PULSE WIDTH MODULATED CONTROLLER FOR NITROUS OXIDE AND FUEL DELIVERY

[75] Inventor: David Dahlgren, 2 Ashby St., Mystic, Conn. 06355

[73] Assignees: David Rook, Hempstead, N.Y.; David Dahlgren, Mystic, Conn.

[21] Appl. No.: 970,395

[22] Filed: Nov. 2, 1992

[51] Int. Cl.⁵ ............................................. F02B 75/12
[52] U.S. Cl. .................................... 123/492; 123/1 A
[58] Field of Search ....................... 123/1 A, 492, 478

[56] References Cited

U.S. PATENT DOCUMENTS

| | | | |
|---|---|---|---|
| 4,494,488 | 1/1985 | Wheatley | 123/1 A |
| 4,572,140 | 2/1986 | Wheatley | 123/1 A |
| 4,683,843 | 8/1987 | Norcia et al. | 123/1 A |
| 4,688,522 | 8/1987 | McMaster | 123/1 A |
| 4,798,190 | 1/1989 | Vaznaian et al. | 123/1 A |
| 4,840,157 | 6/1989 | Furrow | 123/1 A |
| 4,955,348 | 9/1990 | Budde et al. | 123/478 |
| 5,088,464 | 2/1992 | Meaney | 123/478 |
| 5,091,858 | 2/1992 | Paielli | 123/480 |
| 5,174,263 | 12/1992 | Meaney | 123/478 |

OTHER PUBLICATIONS

"Thunder Twin Fuel Injection by Accel", promotional brochure, Accel Motorcycle Products, Branford, Conn. (no date).
"Thunder Twin Fuel Injection", Owner's Manual, Accel Motorcycle Product, Branford, Conn., 1991.
Calmap 6.0 Instructions.

Primary Examiner—E. Rollins Cross
Assistant Examiner—Erick Solis
Attorney, Agent, or Firm—Galgano & Belkin

[57] ABSTRACT

A pulse width modulated controller for $N_2O$ and enrichment fuel delivery includes a system control logic section which processes signals from sensors for throttle position, engine speed and a number of other user-selectable parameters and a driver section controls electrically operated injectors or solenoid valves. The driver section allows the injectors to open only when all of the parameters sensed in the control section are met. Moreover, the driver section activates injectors according to a pulse generated by a pulse width modulation section which determines how long the injectors will remain activated. The pulse width modulation section receives signals based on the present throttle position and engine speed and adjusts these values according to values for $N_2O$ and enrichment fuel based on engine speed and throttle position set by the user in a tuning section and thereby continuously provides the driver section with a pulse having a width proportional to the proper amount of $N_2O$ and enrichment fuel which should be delivered at any given time. In addition, the tuning section is also user-settable to a maximum ignition timing adjustment and provides a signal proportional to ignition timing retard to an ignition control section for automatically adjusting ignition timing according to the amount of $N_2O$ and enrichment fuel being delivered at any given moment.

8 Claims, 6 Drawing Sheets

PULSE WIDTH MODULATED CONTROLLER FOR NITROUS OXIDE AND FUEL DELIVERY

FIELD OF THE INVENTION

The present invention relates to automotive fuel injection systems. More particularly, the invention relates to a system for injecting liquid nitrous oxide and enrichment fuel in a high performance vehicle.

BACKGROUND OF THE INVENTION

Chemical supercharging of racing engines is well known in the art. Nitrous oxide ($N_2O$) is a non-flamable liquid/gas used for such chemical supercharging which when introduced into the combustion chamber of an engine breaks down into its components of nitrogen and oxygen. The free oxygen is then available to oxidize additional fuel ("enrichment fuel") that is supplied to the engine and mixed with the oxygen resulting in a large increase in power. $N_2O$ injection or charging is usually performed only at critical periods of a race to provide a sudden burst of power since the amount of $N_2O$ injected is difficult to meter and the use of $N_2O$ can be hazardous if too much $N_2O$ is injected.

$N_2O$ charging or injecting systems usually consist of a cylinder or container holding a supply of liquid $N_2O$ under pressure, typically 900 psi. The $N_2O$ supply is connected by a conduit to a solenoid actuated valve at the carburetor of the engine. The solenoid actuator is operated by the driver from within the vehicle at the instant that a sudden burst of power is required. The $N_2O$ supply container is usually quite small due to weight and space limitations in racing vehicles. This present several problems: the pressure in the small container drops quickly once the solenoid actuated valve is opened and thus affects the amount of $N_2O$ injected. Since an improper mixture of oxygen and fuel will actually decrease performance, $N_2O$ injection can only last a few seconds.

The actual amount of $N_2O$ which should be injected is a function of engine speed (RPM) and if too little $N_2O$ is injected, the performance increase is limited. Moreover, if too much $N_2O$ is injected, the engine will be seriously damaged.

Several systems have been proposed for controlling and/or automating $N_2O$ injection. U.S. Pat. No. 4,494,488 to Wheatley discloses a "Fuel Charging System for High Performance Vehicles" which includes a supply cylinder of pressurized liquid $N_2O$ connected by an outlet conduit to the vehicle engine. A second cylinder of nitrogen gas under a considerably higher pressure is connected to the $N_2O$ cylinder through a pressure regulator. The nitrogen gas maintains a high pressure blanket over the $N_2O$ to force the $N_2O$ into the engine at a relatively constant and sustained rate. This results in an additional several seconds during which $N_2O$ injection may be performed.

U.S. Pat. No. 4,683,843 to Norcia et al discloses a "Nitrous Oxide Fuel Injection Safety System" which includes a container of pressurized $N_2O$ supplied to the engine through a spray bar. The supply line is also connected to a vent tube having a normally open solenoid valve communicating with a one-way low pressure actuated check valve to prevent excess buildup of $N_2O$ in the engine. A pair of pressure actuated electrical switches are connected to and actuated by pressure of oil and fuel to stop $N_2O$ injection when there is insufficient fuel to mix with the $N_2O$ and to prevent $N_2O$ injection when RPM is too low.

All of the known systems for injecting $N_2O$ have one common disadvantage. $N_2O$ is injected in a predetermined amount for a predetermined time only. These systems do not control the amount of $N_2O$ injection over time, but rather control the amount of $N_2O$ injection at a specific time. $N_2O$ injection is still limited to a brief moment of increased power rather than a continuous span of increasing power.

Moreover, it is known in the art that during $N_2O$ and enrichment fuel injection, ignition timing should be retarded by 4°-10°. However, only a few systems include provisions for adjusting ignition timing during $N_2O$ injection.

Electronically controlled fuel injection systems have been widely used in normal gasolene and diesel powered engines. One such system is sold by Haltech, Inc. of Garland, Tex. The Haltech TM F3 electronic fuel injection system includes sensors for air temperature, engine temperature, throttle position, engine rpm and manifold vacuum and a programmable controller so that the amount of fuel applied to combustion chambers is metered in steps according to information gathered by the sensors. Specifically, this system allows programming of 64 different vacuum/pressure adjustments to map fuel delivery over the range of engine speeds. It is only recently, however, that this technology has been applied to $N_2O$ fuel injection systems.

Nitrous Oxide Systems of Cypress, Calif. has combined features of electronic fuel injection technology with $N_2O$ injection systems to control $N_2O$ boost according to throttle position and temperature and to "ramp" $N_2O$ injection for a more even boost when $N_2O$ injection is activated.

To date, however, these electronically controlled $N_2O$ injection systems operate in a relatively static manner, requiring the user to pre-program the system with a personal computer according to certain parameters which will be followed by the system during activation of $N_2O$ injection.

Recently, Jacobs Electronics of Midland, Tex. has introduced the "Nitrous Mastermind" (NMM) system. This system allows the user to present the rpm at which $N_2O$ injection begins and at which $N_2O$ injection reaches 100%. The NMM system begins $N_2O$ injection at 40-50% and increases injection to 100% over a straight line proportional to the selected engine speeds. The system also includes several safety features such as an automatic shut-off when fuel pressure falls and/or rpm drops. The NMM system also includes an ignition timing retard adjustment which retards ignition timing 4°-10° during $N_2O$ injection.

The NMM system does not, however, account for throttle position as a factor in considering the amount of $N_2O$ injection. It does not allow the adjustment of offset or slope in plotting the $N_2O$ injection curve. In fact, the NMM system does not plot an injection curve but uses a straight line "in direct proportion to the engine rpm".

SUMMARY OF THE INVENTION

It is an object of the present invention to provide an electronic control system for $N_2O$ and enrichment fuel delivery which automatically controls the rate of $N_2O$ and enrichment fuel delivery according to rpm, throttle position, oil pressure, and fuel pressure.

It is also an object of the invention to provide a simple means for adjusting the starting point of $N_2O$ and enrichment fuel injection and the slope of the delivery curve without requiring complicated programming of the system.

It is another object of the invention to link N₂O injection and enrichment fuel injection so that the proper ration of N₂O/enrichment fuel is always maintained.

It is still another object of the invention to automatically adjust ignition timing by as much as 20° to compensate for N₂O injection.

It is also an object of the invention to provide a gradual injection of N₂O and enrichment fuel for a predictable increase in power.

It is another object of the invention to provide for auxiliary inputs so that injection of N₂O and enrichment fuel may be controlled according to a number of user-selected additional parameters including safety devices to automatically shut down N₂O injection upon the sensing of any particular condition.

It is yet another object of the invention to create a "universal stand-alone" system which is not limited to the number of cylinders, N₂O injectors, fuel injectors, or electrical current capacity which will work in an automobile, a boat, a plane or a stationary engine with carburetors or fuel injection, either 2 stroke or 4 stroke, rotary, diesel, gasoline, LPG, natural gas, or alcohol powered.

These objects and others are achieved by a pulse width modulated controller for N₂O and enrichment fuel delivery where a plurality of inputs including throttle position and engine speed are combined to determine the starting point of N₂O and enrichment fuel injection; where the throttle position and engine speed are constantly monitored and the amount of N₂O and enrichment fuel delivered to the engine is increased automatically as throttle position and engine speed increase; and where ignition timing is automatically adjusted in proportion to the amount of N₂O and enrichment fuel delivered to the engine.

In accord with the invention, the preferred pulse width modulated controller for N₂O and enrichment fuel delivery includes a system control logic section where signals from sensors for throttle position, engine speed and a number of other user-selectable parameters are combined and sent to a driver section which controls electrically operated injectors or solenoid valves. The driver section allows the injectors to open only when all of the parameters sensed in the control section are met. Moreover, the driver section activates injectors according to a pulse generated by a pulse width modulation section which determines how long the injectors will remain activated. The pulse width modulation section receives signals based on the present throttle position and engine speed and adjusts these values according to values for N₂O and enrichment fuel based on engine speed and throttle position set by the user in a tuning section and thereby continuously provides the driver section with a pulse having a width proportional to the proper amount of N₂O and enrichment fuel which should be delivered at any given time. Moreover, the tuning section which monitors engine speed and throttle position and has been set with amounts of N₂O and enrichment fuel deliverable accordingly, is also user-settable to a maximum ignition timing adjustment and provides a signal proportional to ignition timing retard to an ignition control section for automatically adjusting ignition timing according to the amount of N₂O and enrichment fuel being delivered at any given moment.

BRIEF DESCRIPTION OF THE DRAWING

With these and other objects in view, which will become apparent in the following detailed description, the present invention, which is shown by example only, will be clearly understood in connection with the accompanying drawing, in which.

DESCRIPTION OF THE PREFERRED EMBODIMENTS

Figure 1:
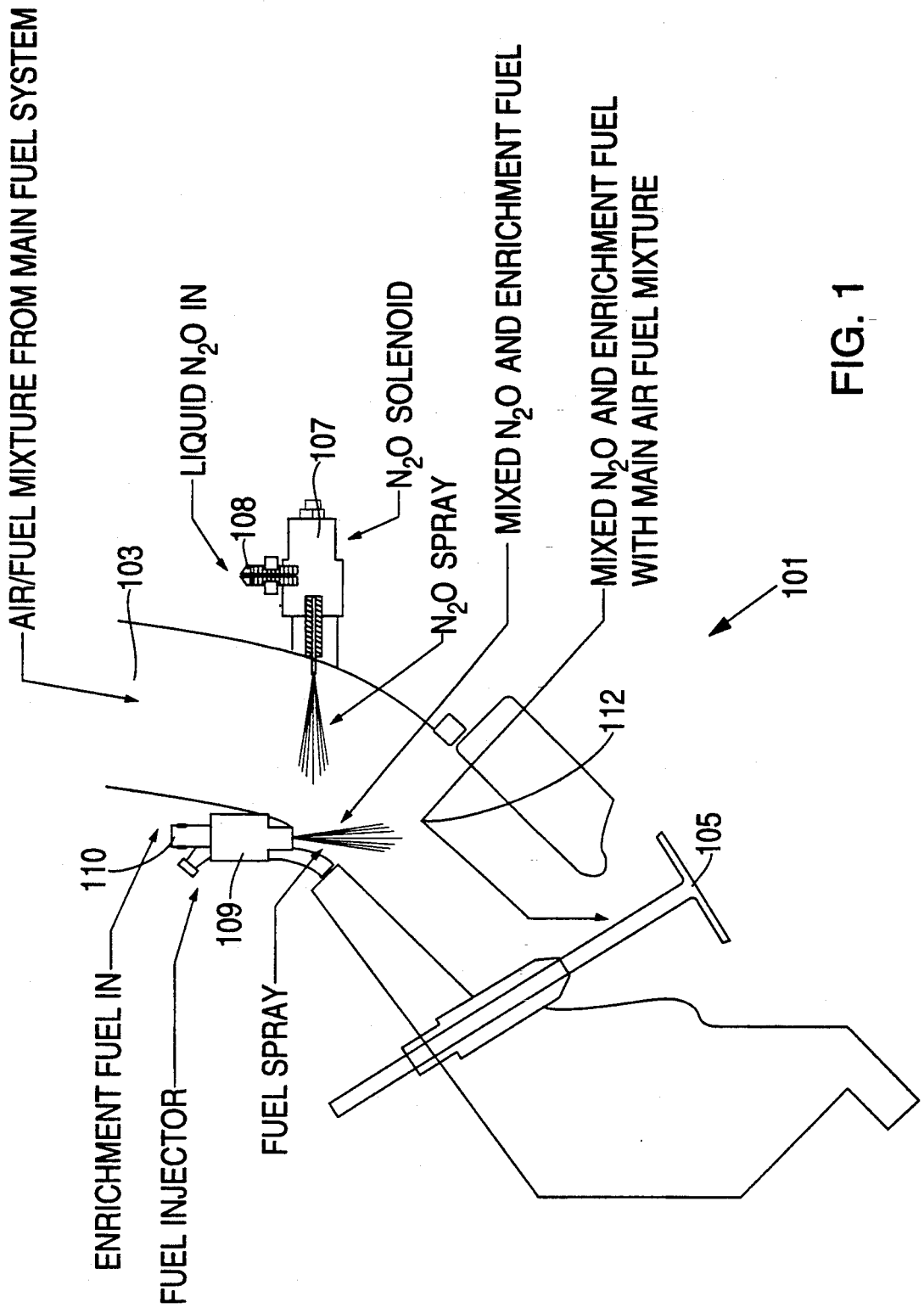
FIG. 1 is a cross sectional schematic view of a fuel intake passage with injectors for enrichment fuel and N₂O.

Turning now to FIG. 1, an intake passage 101 of an engine is shown in the vicinity of intake valve 105. There is typically one such intake passage for each cylinder in the engine. Normally, an air/fuel mixture 103 enters the intake passage upstream of the intake valve 105 from the main fuel system of the engine (not shown). In FIG. 1, the intake passage 101 is modified to include a solenoid operated N₂O injector 107 and an enrichment fuel injector 109. Injectors 109 and 107 are coupled through connections 110, 108 to respective sources of enrichment fuel and N₂O (not shown) and are controlled by the electronic control system of the invention which is described in detail below. When activated by the control system of the invention, injectors 109, 107 inject measured amounts of enrichment fuel and N₂O which are mixed together with each other and with the air/fuel mixture 103 at a point 112 downstream of the injectors but still upstream of the intake valve 105. The installation of separate enrichment fuel and N₂O injectors at each intake passage is the preferred method of utilizing the electronic control system of the invention. However, it is possible to use the invention with a single enrichment fuel injector and a single N₂O injector in a carbureted engine.

Figure 2:
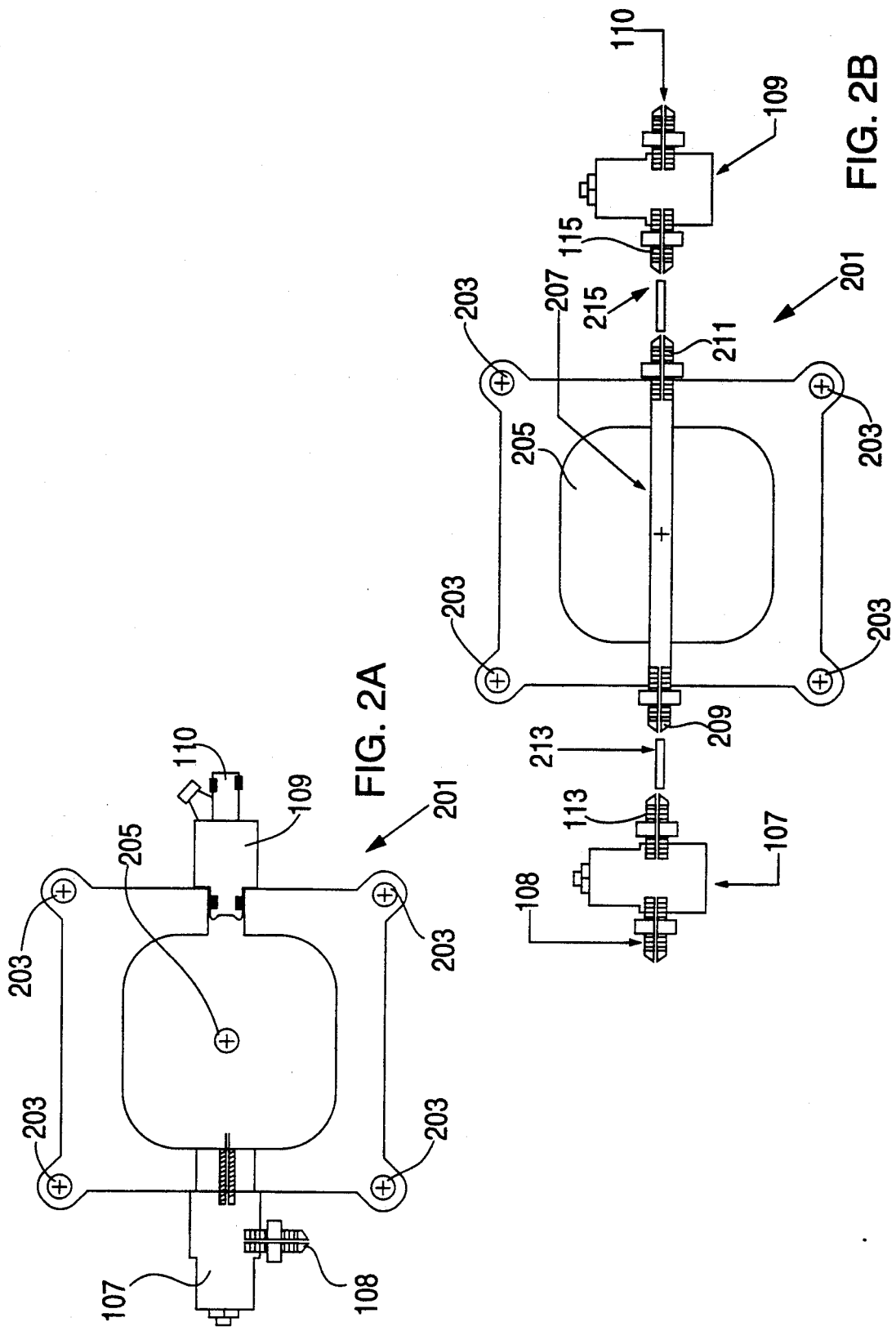
FIGS. 2a and 2b are plan schematic views of modified carburetor plates with enrichment fuel and N₂O injectors.

FIGS. 2a and 2b show two arrangements for using a single enrichment fuel injector and a single N₂O injector in a carbureted engine. FIG. 2a shows a carburetor spacer plate 201 having a bolt patern 203 to match a particular carburetor. Intake manifold 205 receives a mixture of air and fuel from the carburetor (not shown). An enrichment fuel injector 109 and a N₂O solenoid valve (injector) 107 are mounted opposite each other in the sides of the spacer plate 201. The injectors 107, 109 are coupled via connections 108, 110 to respective supplies of N₂O and enrichment fuel (not shown) and are activated by the electronic control system described below.

FIG. 2b shows an alternative embodiment to the arrangement shown in FIG. 2a. Here, a carburetor spacer plate 201 with a bolt pattern 203 matching a particular carburetor is provided with a spray bar 207 passing through the intake manifold 205. The spray bar is provided with couplings 209, 211 for connection with connecting lines 213, 215 which in turn are coupled via connections 113, 115 with N₂O solenoid valve 107 and enrichment fuel solenoid valve 109. Valves 107, 109 are coupled via connections 108, 110 to respective supplies of N₂O and enrichment fuel (not shown) and are activated by the electronic control system described below.

Figure 3:
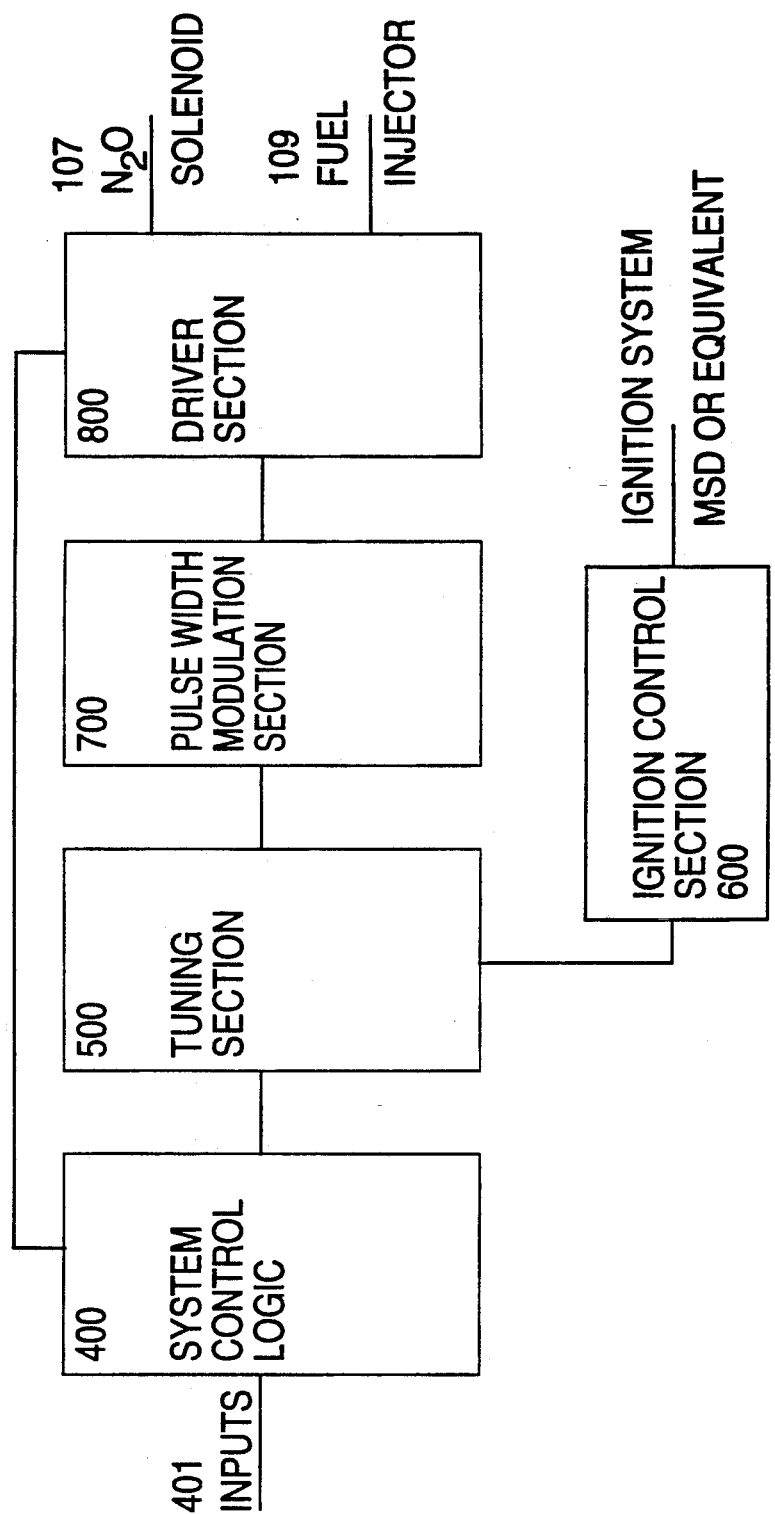
FIG. 3 is a block diagram of the electronic control system of the invention.

The inventive control circuit for activating N₂O and enrichment fuel injectors (or solenoid valves) is shown and described with reference to FIGS. 3–8. Turning now to FIG. 3, the basic components of the control system are shown in a block diagram. A variety of inputs 401, which are described in detail below, supply signals to the system control logic 400 which combines these signals to determine a threshold condition upon which injection will begin and provides signals for the tuning section 500 and the driver section 800. The tuning section 500 takes signals from the system control logic and processes these signals according to user-set parameters. The processed signals from the tuning section 500 are sent to the ignition control section 600 and the pulse width modulation section 700. The ignition control section 600 generates a signal to retard ignition timing depending on the signals it receives from the tuning section 500. The pulse width modulation section 700 includes a clock generator and compares signals from the tuning section with integrated clock pulses to supply the driver section 800 with a pulse of variable width to control the duration of N₂O and enrichment fuel injection. The driver section 800 takes the pulses from the pulse width modulation section 700 and control signals from the system control logic 400 to provide driving signals to actuate the N₂O and enrichment fuel solenoids 107 and 109.

Figure 4:
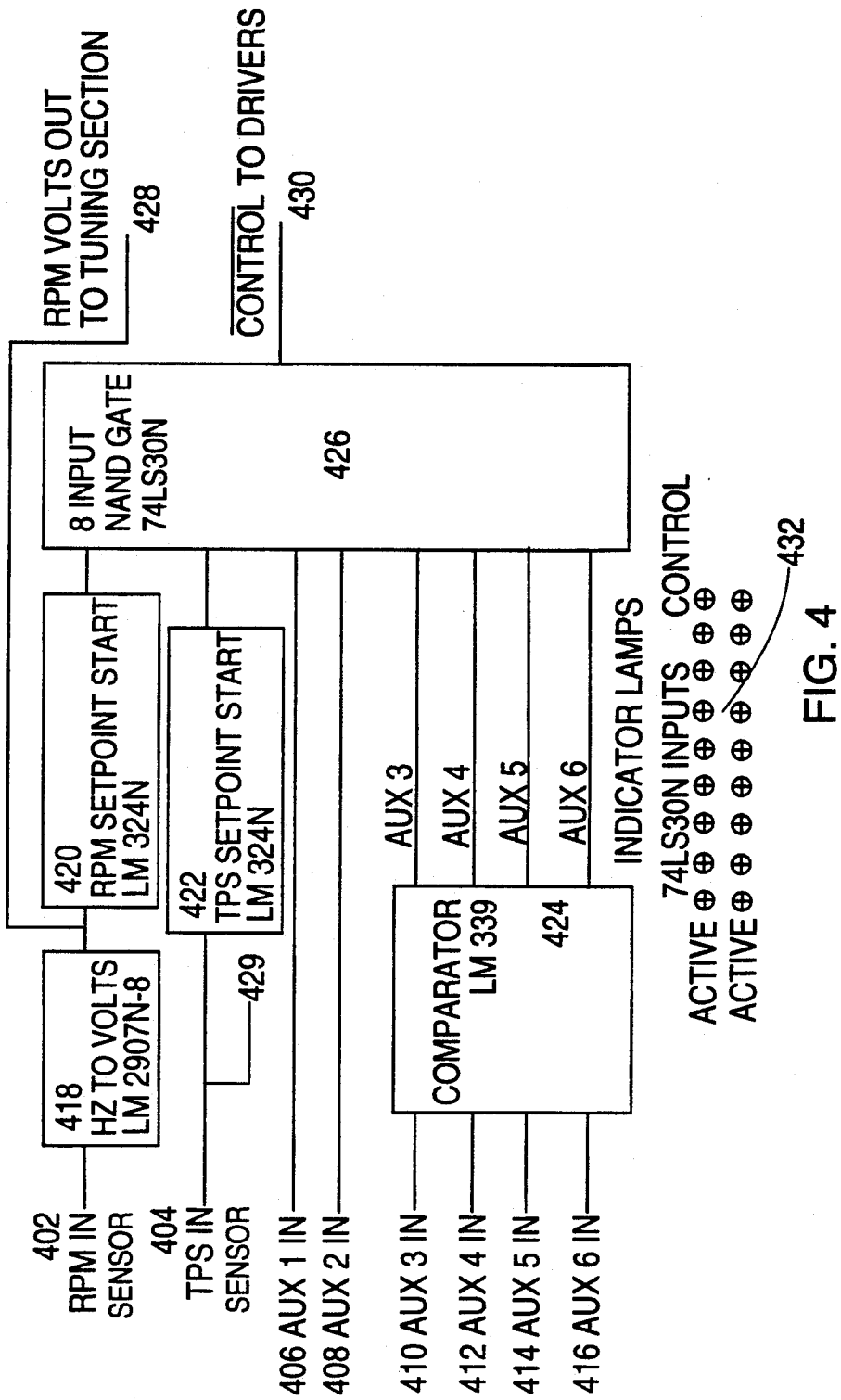
FIG. 4 is a block diagram of the system control logic section of the electronic control system of FIG. 3.

FIG. 4 shows a block diagram of the details of the system control logic 400 of FIG. 3. In this figure, eight inputs are shown, but only two of these inputs are critical. Input 402 accepts a signal in Hz describing engine RPM. Input 404 accepts a signal in volts referencing throttle position. These inputs are used to decide when the system is to begin operation. Input 402 in Hz is converted to volts at 418. This voltage is supplied by output 428 to the tuning section 500 (described below) and also compared to a setpoint at 420. This setpoint is adjustable by the user to indicate at what RPM voltage the system should begin N₂O and enrichment fuel injection. Similarly, input 404 is supplied by output 429 to the tuning section 500 (described below) and also is compared to a user-adjustable stepoint at 422 to determine at what throttle position voltage the system should start N₂O and enrichment fuel injection. A number of other inputs may be combined with these to determine a particular combination of threshold factors which will govern the start of N₂O and enrichment fuel injection. As shown in FIG. 4, inputs 406 and 408 will accept a positive voltage as an active condition and inputs 410, 412, 414, and 416 will accept a signal that goes to ground as an active condition. These six AUX inputs are included as an option for special requirements of a particular user and will be jumpered out if not used. It is contemplated that these inputs be used for sensors such as fuel pressure, oil pressure, engine temperature, overspeed, engine knock sensor, transmission gear engaged, wheel spin (comparison of front and rear wheel speed), N₂O pressure, trans brake/line lock, or a system arming switch. As shown in FIG. 4, these inputs may pass through a comparator 424 to set a voltage threshold for a valid condition that is above the electrical noise that may be present on the inputs and eliminate the potential problem of a false "ON" condition.

All of the inputs are subjected to NAND gate 426 and the resulting control signal 430 to the driver section 800 (described below) is true (low) only when all inputs are true, resulting in no possibility of injection unless all inputs are true.

The system control section may also be provided with a number of indicator lights 432 which indicate the status of all inputs and the status of the control output.

Figure 5:
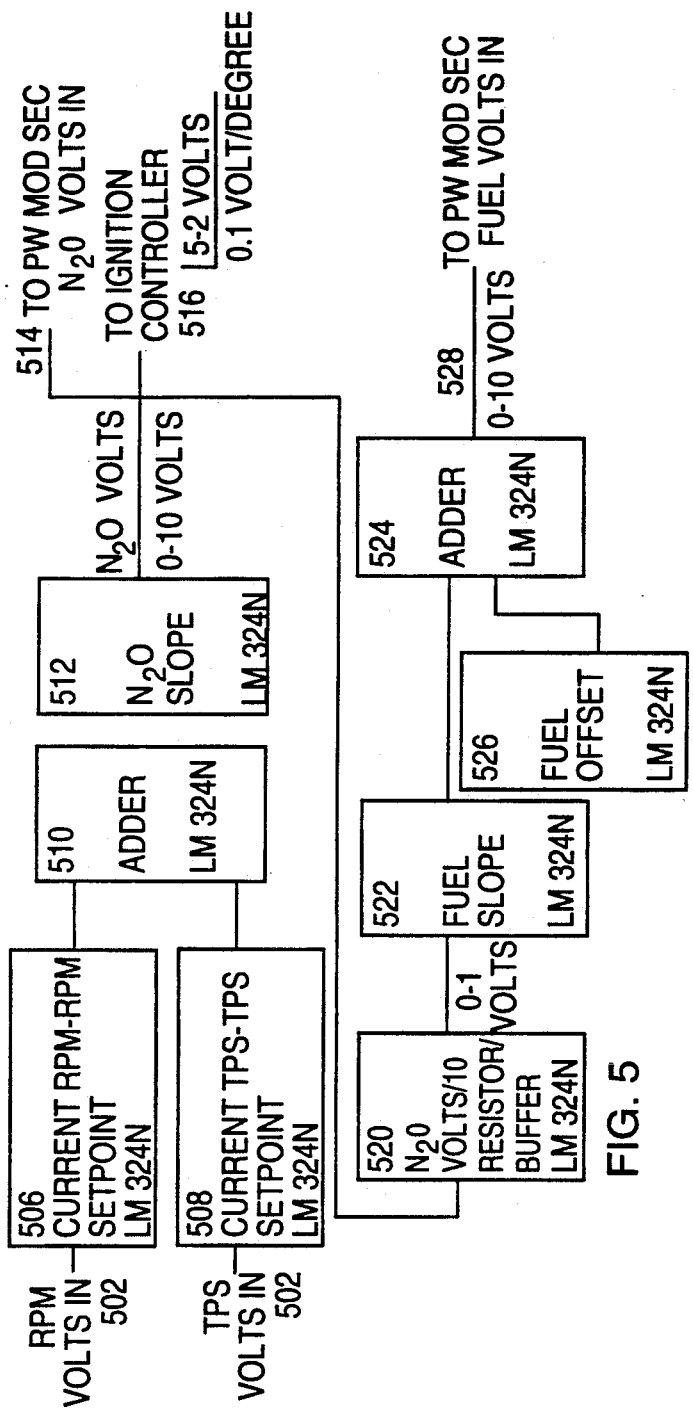
FIG. 5 is a block diagram of the system tuning section of the electronic control system of FIG. 3.

Turning now to FIG. 5, the system tuning section includes input 502 for RPM voltage as supplied by output 428 from the system control logic described above with reference to FIG. 4 and an input for throttle position voltage 504 as supplied by output 429 from the system control logic described above with reference to FIG. 4. These voltages are subtracted from the set-point values by opamps at 506 and 508 respectively to produce a value of 0 volts at the system start. As engine speed and throttle position increase, these voltages increase and they are summed by adder 510. The sum of these voltages is then multiplied by a user-set factor at opamp 512 to determine the rate of power increase. This multiplied voltage is then supplied to three places: the pulse width modulation section 700 (described below) through output 514, the ignition control section 600 through output 516, and to an opamp 520 to control the rate of enrichment fuel which will compliment the N₂O injection. The enrichment fuel signal from opamp 520 is multiplied at 522 to a rate of injection and can be added at 524 to an initial rich fuel condition as supplied by user-set fuel offset value 526. The resultant enrichment fuel voltage signal is output at 528 to the pulse width modulation section 700 (described below).

Figure 6:
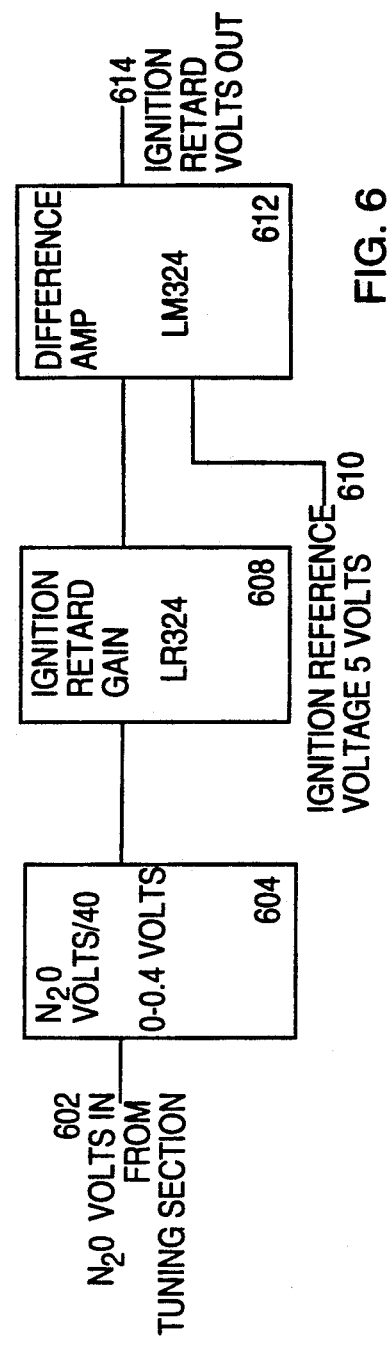
FIG. 6 is a block diagram of the ignition control section of the electronic control system of FIG. 3.

Turning now to FIG. 6, the ignition control section includes input 602 for N₂O volts as supplied by output 516 from the system tuning section described above with reference to FIG. 5. This input represents the percentage of N₂O that is presently being injected. The input 602 is first scaled to a fraction of its value and then scaled by a user selectable multiple at 608 to the total amount of desired ignition spark retard. This scaled voltage is then compared at 612 with a reference of 5 volts resulting in an output voltage of 0–5 volts which is compatible with ignition timing spark controllers manufactured by Automatic Controls of El Paso, Tex.

Figure 7:
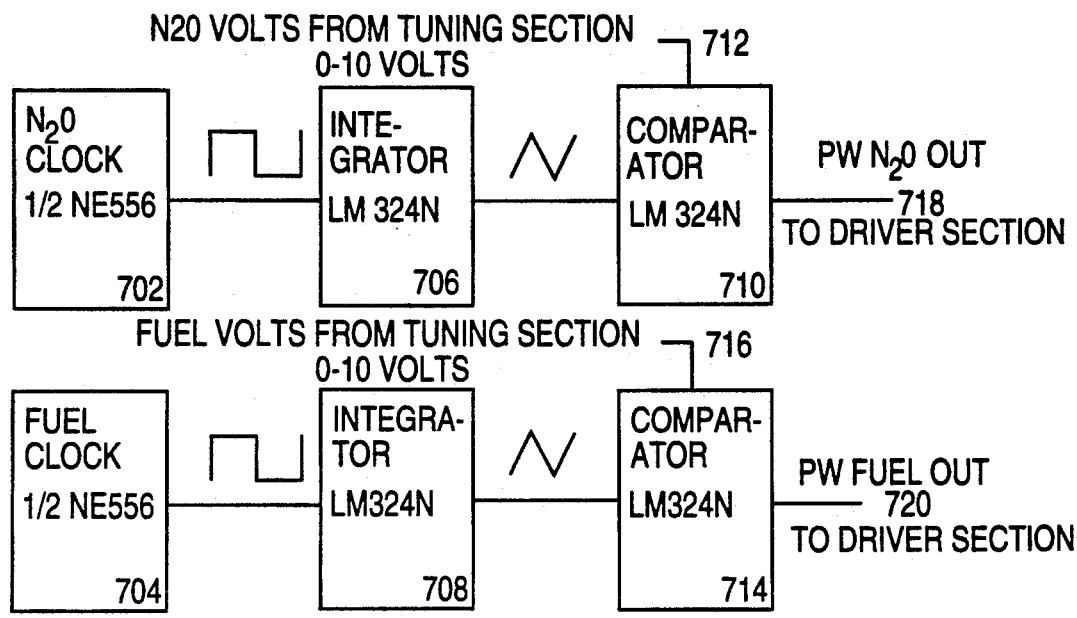
FIG. 7 is a block diagram of the pulse width modulation section of the electronic control system of FIG. 3.

Turning now to FIG. 7, the pulse width modulation section includes two clocks 702 and 704 which may be constructed from a single "NE 566" timer chip having a square wave output. Clock 702 provides a pulse which will be used to drive N₂O injection and clock 704 provides a pulse which will be used to drive enrichment fuel injection. Square waves from clocks 702, 704 are first integrated to saw-tooth waves of the same frequency at 706 and 708 respectively and then each wave is compared at 710 and 716 to voltage outputs from the tuning section which was described above with reference to FIG. 5. Specifically, the N₂O wave is compared to the N₂O voltage output 514 (FIG. 5) and the enrichment fuel wave is compared to the enrichment fuel voltage output 528 (FIG. 5). The resulting outputs 718 and 720 of the pulse width modulation section are square waves with pulse widths proportional to the voltages supplied at comparator inputs 712 and 716 respectively.

Figure 8:
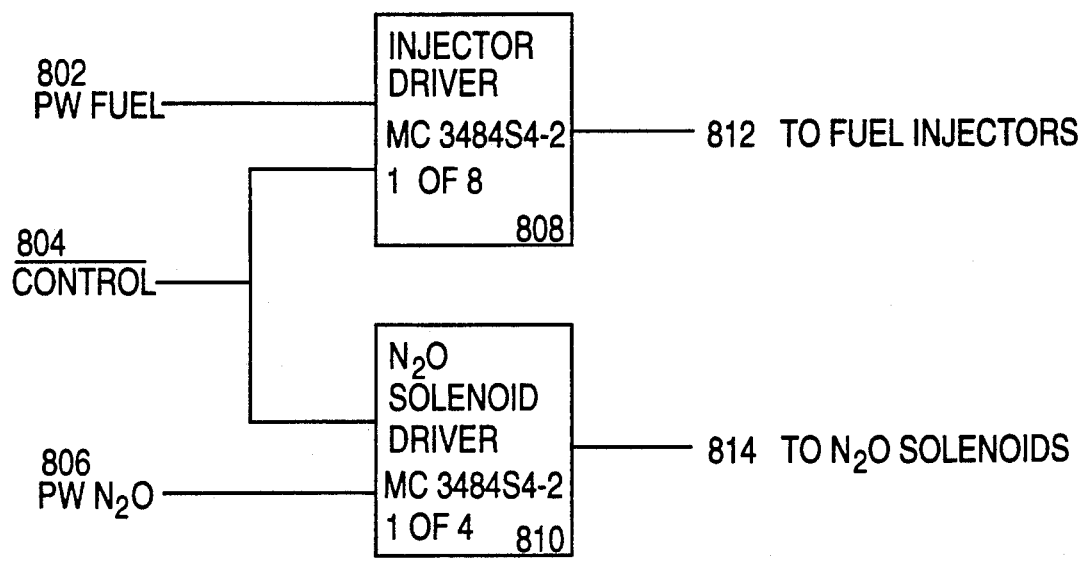
FIG. 8 is a block diagram of the driver section of the electronic control system of FIG. 3.

Turning now to FIG. 8, the driver section includes pulse width input 802 for enrichment fuel which is supplied by output 720 described above and pulse width input 806 for N₂O which is supplied by output 718 described above. The driver section also receives a control input 804 from output 430 of the system control logic described above with reference to FIG. 4. These inputs are coupled to injector drivers 808 and 810 to control enrichment fuel injectors and N₂O injectors or solenoids. Typically there will be one driver 808 for each enrichment fuel injector and one driver 810 for each N₂O solenoid or injector.

The pulse width modulation controller of the invention operates as follows:

First, the user sets the desired parameters for RPM setpoint and TPS (throttle position setpoint) so that the controller is set as to what engine speed and throttle position injection will begin. Next, the user sets the N₂O slope and the enrichment fuel slope so that the controller is set as to the rate of power increase. Then the user sets the fuel offset to the richness of fuel during startup. For example, a fuel offset of 20% will result in a gentle start on a race track with poor traction while a fuel offset of 0% will result in a hard start on a race track with good traction. Finally, the user sets the maximum amount of ignition spark retard required during maximum N₂O and enrichment fuel injection. Testing has shown that an offset as much as 20 degrees or more may be needed depending on engine output. If there are other devices connected to the system control logic (inputs AUX1-AUX6 in FIG. 4) these may require setting as well.

During operation of the engine, the system control logic (FIG. 4) monitors inputs from RPM, TPS and any other AUX inputs for conditions which signal the start of N₂O and enrichment fuel injection. Typically, this will be a certain RPM and throttle position. Upon detecting the start of injection, a control signal is sent to the drivers (FIG. 8) and voltages proportional to TPS and RPM are sent to the tuning section (FIG. 5). The tuning section applies the slope and the offset for injection, sends voltages proportional to N₂O amount and enrichment fuel amount to the pulse width modulation section (FIG. 7) and sends a voltage proportional to N₂O amount to the ignition control section (FIG. 6). The ignition control section adjusts this voltage according to the user-set ignition retard gain and subtracts a reference voltage so that the output of the ignition control section is within the range of a known ignition timing controller such as those manufactured by Automatic Controls of El Paso, Tex., mentioned above. Typically, the startup flow of N₂O will be 10-18% of the system capacity depending on solenoid valve size. Since throttle position is considered in addition to engine rpm, smooth control can be maintained in a marginal traction situation. If the driver begins to lose traction, a reduction of throttle position can cut the N₂O boost by 20-25% while maintaining substantially constant rpm. Once traction is regained, movement of the throttle position will reapply N₂O boost to the maximum programmed for the rpm and throttle position in question.

Meanwhile, the pulse width modulation section (FIG. 7) compares integrated clock pulses to the voltages for N₂O amount and enrichment fuel amount and outputs square wave pulses for N₂O amount and enrichment fuel amount which have a width proportional to the amount of injection. These pulses are then sent to the driver section (FIG. 8) which includes injector drivers (e.g. Motorola 3484S4-2) for each N₂O and enrichment fuel injector (or solenoid valve). The drivers open the injectors (or solenoids) to inject enrichment fuel and N₂O when the control pulse from the system control logic (FIG. 4) is low and active and for a duration equal to the width of the square wave pulses from the pulse width modulation section (FIG. 7).

Thus, the pulse width modulation control system of the invention continuously adjusts the amount of N₂O and enrichment fuel injection from a preset throttle position and rpm through increasing throttle positions and rpm until 100% of the maximum injection is reached and simultaneously adjusts ignition timing as injection increases.

All of the parts used in the circuit of the invention are readily available from National Semiconductor of Santa Clara, Calif. or from Motorola, Inc. of Phoenix, Ariz. and the part numbers listed in the figures are indicative of these sources. Other parts of the system, such as sensors for rpm and throttle position and the injectors and/or solenoid valves are readily available through a number of sources as are known to those of ordinary skill in the art.

Although the invention is described and illustrated with reference to a plurality of embodiments thereof, it is to be expressly understood that it is in no way limited to the disclosure of such preferred embodiments but is capable of numerous modifications within the scope of the appended claims.

I claim:

1. A pulse width modulated controller for nitrous oxide and enrichment fuel delivery comprising
    engine speed sensing means delivering a signal proportional to engine speed;
    throttle position sensing means delivering a signal proportional to throttle position;
    gate means coupled to said engine speed sensing means and said throttle position sensing means, said gate means generating a binary signal output when a threshold engine speed and throttle position are reached;
    a first programmable memory means for storing a value corresponding to rate of nitrous oxide delivery;
    a second programmable memory means for storing a value corresponding to rate of enrichment fuel delivery;
    a first multiplier means coupled to said first memory means and said engine speed sensing means and said throttle position sensing means for generating a first multiplier output signal proportional to amount of nitrous oxide to be delivered;
    a second multiplier means coupled to said second memory means and said engine speed sensing means and said throttle position sensing means for generating a second multiplier output signal proportional to amount of enrichment fuel to be delivered;
    a clock means generating a pulse of predetermined frequency;
    first comparator means coupled to said clock means and said first multiplier output signal generating a first pulse output having a pulse width proportional to amount of nitrous oxide to be delivered;
    second comparator means coupled to said clock means and said second multiplier output signal generating a second pulse output having a pulse width proportional to amount of enrichment fuel to be delivered;

a nitrous oxide driver means driving a nitrous oxide injector, said nitrous oxide driver coupled to said first pulse output and said binary signal output; and an enrichment fuel driver means driving an enrichment fuel injector, said enrichment fuel driver coupled to said second pulse output and said binary signal output;

wherein said rate of nitrous oxide delivery and said rate of enrichment fuel delivery are continuously adjusted according to engine speed and throttle position by continuously varying said pulsewidth proportional to the amount of nitrous oxide and said pulsewidth proportional to the amount of enrichment fuel.

2. A pulse width modulated controller for nitrous oxide and enrichment fuel delivery as claimed in claim 1, further comprising ignition timing control means coupled to said first multiplier output signal.

3. A pulse width modulated controller for nitrous oxide and enrichment fuel delivery as claimed in claim 1, wherein said gate means includes third programmable memory means for storing a value corresponding to said threshold engine speed and fourth programmable memory means for storing a value corresponding to said threshold throttle position; and wherein said nitrous oxide and said enrichment fuel are continuously delivered according to said continuously adjusted rates when said threshold engine speed and said threshold throttle position have been reached.

4. A pulse width modulated controller for nitrous oxide and enrichment fuel delivery as claimed in claim 1, wherein said first multiplier means is coupled to said engine speed sensing means and said throttle position sensing means through an adder.

5. A pulse width modulated controller for nitrous oxide and enrichment fuel delivery as claimed in claim 1, wherein said second multiplier means is coupled to said engine speed sensing means and said throttle position sensing means through a first adder.

6. A pulse width modulated controller for nitrous oxide and enrichment fuel delivery as claimed in claim 5, further comprising a fifth programmable memory means for storing a value proportional to initial enrichment fuel richness;

the output of said second multiplier means being coupled to said fifth memory means through a second adder.

7. A pulse width modulated controller for nitrous oxide and enrichment fuel delivery comprising first sensor means for determining present engine speed;

second sensor means for determining present throttle position;

first memory means for storing a threshold engine speed;

second memory means for storing a threshold throttle position;

first comparator means coupled to said first sensor means and said first memory means for comparing said present engine speed and said threshold engine speed, said first comparator means having a binary output;

second comparator means coupled to said second sensor means and said second memory means for comparing said present throttle position and said threshold throttle position, said second comparator means having a binary output;

'AND' gate means coupled to said first and second comparators, said gate means having a binary control output;

third memory means for storing a nitrous oxide delivery rate;

fourth memory means for storing an enrichment fuel delivery rate;

first multiplier means coupled to said first and second sensor means and said third memory means for generating a signal proportional to amount of nitrous oxide to be presently delivered;

second multiplier means coupled to said first and second sensor means and said fourth memory means for generating a signal proportional to amount of enrichment fuel to be presently delivered;

a nitrous oxide injector driver coupled to a nitrous oxide injector, an enrichment fuel injector driver coupled to an enrichment fuel injector;

said drivers coupled to said binary control output and said first and second multiplier signals;

wherein said nitrous oxide delivery rate and said enrichment fuel delivery rate are continuously adjusted according to engine speed and throttle position by continuously varying a nitrous oxide injection pulsewidth proportional to the amount of nitrous oxide and a fuel enrichment injection pulsewidth proportional to the amount of enrichment fuel; and wherein said nitrous oxide and said enrichment fuel are continuously delivered according to said continuously adjusted rates when said threshold engine speed and said threshold throttle position have been reached.

8. A method for controlled delivery of nitrous oxide and enrichment fuel comprising the steps of preselecting a threshold engine speed and throttle position upon which delivery of nitrous oxide and enrichment fuel will commence;

preselecting a rate of nitrous oxide delivery and a rate of enrichment fuel delivery;

monitoring engine speed and throttle position;

continuously adjusting the preselected rates of nitrous oxide delivery and enrichment fuel delivery according to engine speed and throttle position by continuously varying a nitrous oxide injection pulsewidth proportional to the amount of nitrous oxide and a fuel enrichment injection pulsewidth proportional to the amount of enrichment fuel;

continuously delivering nitrous oxide and enrichment fuel according to said adjusted rates when said threshold engine speed and throttle position have been reached.

* * * * *